US009481215B2

(12) United States Patent
Reiss

(10) Patent No.: US 9,481,215 B2
(45) Date of Patent: *Nov. 1, 2016

(54) AIR PRESSURE CONTROL SYSTEM

(71) Applicant: Brian Reiss, Halifax, MA (US)

(72) Inventor: Brian Reiss, Halifax, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/054,799

(22) Filed: Feb. 26, 2016

(65) Prior Publication Data

US 2016/0176244 A1    Jun. 23, 2016

Related U.S. Application Data

(63) Continuation-in-part of application No. 14/699,555, filed on Apr. 29, 2015, now Pat. No. 9,302,554.

(60) Provisional application No. 61/996,235, filed on May 2, 2014.

(51) Int. Cl.

| G05D 1/00 | (2006.01) |
|---|---|
| G05D 3/00 | (2006.01) |
| G06F 7/00 | (2006.01) |
| G06F 17/00 | (2006.01) |
| B60C 23/00 | (2006.01) |
| B60C 23/04 | (2006.01) |

(52) U.S. Cl.
CPC .......... *B60C 23/004* (2013.01); *B60C 23/002* (2013.01); *B60C 23/0408* (2013.01)

(58) Field of Classification Search
CPC .............. G07C 5/008; G07C 9/00309; G07C 2009/00793; B60R 25/24; F02N 11/0807

USPC ............................................................. 701/2
See application file for complete search history.

(56) References Cited

U.S. PATENT DOCUMENTS

| 4,269,252 A | 5/1981 | Shapiro |
|---|---|---|
| 5,289,160 A | 2/1994 | Fiorletta |
| 5,342,177 A | 8/1994 | Cheng |
| 5,587,698 A | 12/1996 | Genna |
| 7,430,900 B2 | 10/2008 | Belanger |
| 7,940,163 B2 | 5/2011 | Huang et al. |
| 8,757,232 B2 | 6/2014 | Weibezahn |
| 2009/0096184 A1 | 4/2009 | Krudenscheidt |
| 2010/0024939 A1 | 2/2010 | Kusunoki et al. |
| 2011/0272074 A1 | 11/2011 | Lowery |

FOREIGN PATENT DOCUMENTS

| WO | 2010017674 | 2/2010 |
|---|---|---|
| WO | 2011004229 | 1/2011 |
| WO | 2013114388 | 8/2013 |

*Primary Examiner* — Maceeh Anwari
(74) *Attorney, Agent, or Firm* — Lambert & Associates; Gary E. Lambert; David J. Connaughton, Jr.

(57) ABSTRACT

A system for controlling bicycle tire air pressure on the go is provided. The system has a wheel mounted portion and a control unit in communication with one another. The wheel mounted portion attached to each wheel has a gas source, manifold, regulator to control air flow into and out of the tire, and a communication device. The control unit monitors air pressure in each tire, and has a user interface allowing input of a higher or lower tire pressure. Based on user input, the control unit instructs operation of the wheel mounted portion, controlling pressure within the tire.

20 Claims, 5 Drawing Sheets

AIR PRESSURE CONTROL SYSTEM

BACKGROUND OF THE INVENTION

1. Field of the Invention

The present invention relates generally to tire air pressure control systems. More particularly the present invention relates to a system for increasing and decreasing pressure in bicycle tires on the go.

2. Description of Related Art

In biking, especially mountain biking, riders encounter many varied terrains. When a rider is on a moderately flat hard pack trail, an increased tire pressure can be advantageous as it creates less friction/drag allowing the rider to go faster with less effort. Alternatively, when a rider is on a soft surface, for example sand or leaves, or attempting a climb (riding an incline), it is very beneficial to have a lower tire air pressure to give the rider much more traction by giving the tire more surface to engage the trail. The conventional practice is for the rider to either set the tire air pressure manually before each ride to a single pressure that would be the most accommodating overall for the terrain(s) he or she anticipated for that particular ride. The alternative is to stop riding, dismount the bike, and inflate/deflate the tire air pressure for each different terrain encountered. Indeed, this stopping, checking, and adjusting pressure strategy is common practice, taking up valuable time in a racing condition, and being at best cumbersome in a recreational setting.

Therefore, what is needed is a system that may simply and effectively control tire pressure on a bicycle.

SUMMARY OF THE INVENTION

The subject matter of this application may involve, in some cases, interrelated products, alternative solutions to a particular problem, and/or a plurality of different uses of a single system or article.

In one aspect, a system for controlling a bicycle tire pressure is provided. The system comprises a control unit, and a first and second wheel mounted portion. Each wheel mounted portion comprises a manifold attachable to a hub of a bicycle wheel, a compressed gas source connected to the manifold, an air line extending from the manifold and attachable to a stem of the bicycle wheel, a pressure sensor in communication with the air line, a regulator, and a transceiver to send a data from the pressure sensor relating to the pressure within the tire, and configured to receive a signal instructing the regulator action. The control unit comprises a transceiver in communication (wireless, wired, or the like) with the transceiver of each of the first and second wheel mounted portions, a microprocessor in communication with the transceiver configured to receive a signal input from the pressure sensor and convert this input to a pressure reading, a display, and a user interface. The display is configured to provide a visual indication of the pressure within the tire as converted by the microprocessor. The user interface is in communication with the microprocessor and allows an input instructing an increase in tire pressure and a decrease in tire pressure. The microprocessor being further programmed and configured to communicate operating signals through the transceiver to the regulator of each wheel mounted portion. These operating signals instruct the regulator to either decrease pressure in the tire by releasing gas in the tire through the stem, or increase pressure in the tire by allowing gas from the gas source into the stem in response to input from the user interface.

In another aspect, a bicycle having a system for controlling a tire pressure is provided. The bicycle has a bicycle body having a seat, pedal assembly, a rear wheel connected to the body having a gear connected to the pedal assembly, a front wheel connected to the body and rotatable with respect to the body, and a handlebar connected to the front wheel. The system for controlling tire pressure is attached to the bicycle, and has a control unit, and a first and second wheel mounted portion.

Each wheel mounted portion comprises a manifold attachable to a hub of a bicycle wheel, a compressed gas source connected to the manifold, an air line extending from the manifold and attached to a stem of the bicycle wheel, a pressure sensor in communication with the air line, a regulator, and a transceiver to send a data from the pressure sensor relating to the pressure within the tire, and configured to receive a signal instructing the regulator action.

The control unit comprises a transceiver in communication with the transceiver of each of the first and second wheel mounted portions, a microprocessor in communication with the transceiver configured to receive a signal input from the pressure sensor and convert this input to a pressure reading, a display, and a user interface. The display is configured to provide a visual indication of the pressure within the tire as converted by the microprocessor. The user interface is in communication with the microprocessor and allows an input instructing an increase in tire pressure and a decrease in tire pressure. The microprocessor being further programmed and configured to communicate operating signals through the transceiver to the regulator of each wheel mounted portion. These operating signals instruct the regulator to either decrease pressure in the tire by releasing gas in the tire through the stem, or increase pressure in the tire by allowing gas from the gas source into the stem in response to input from the user interface.

DETAILED DESCRIPTION

Figure 1:
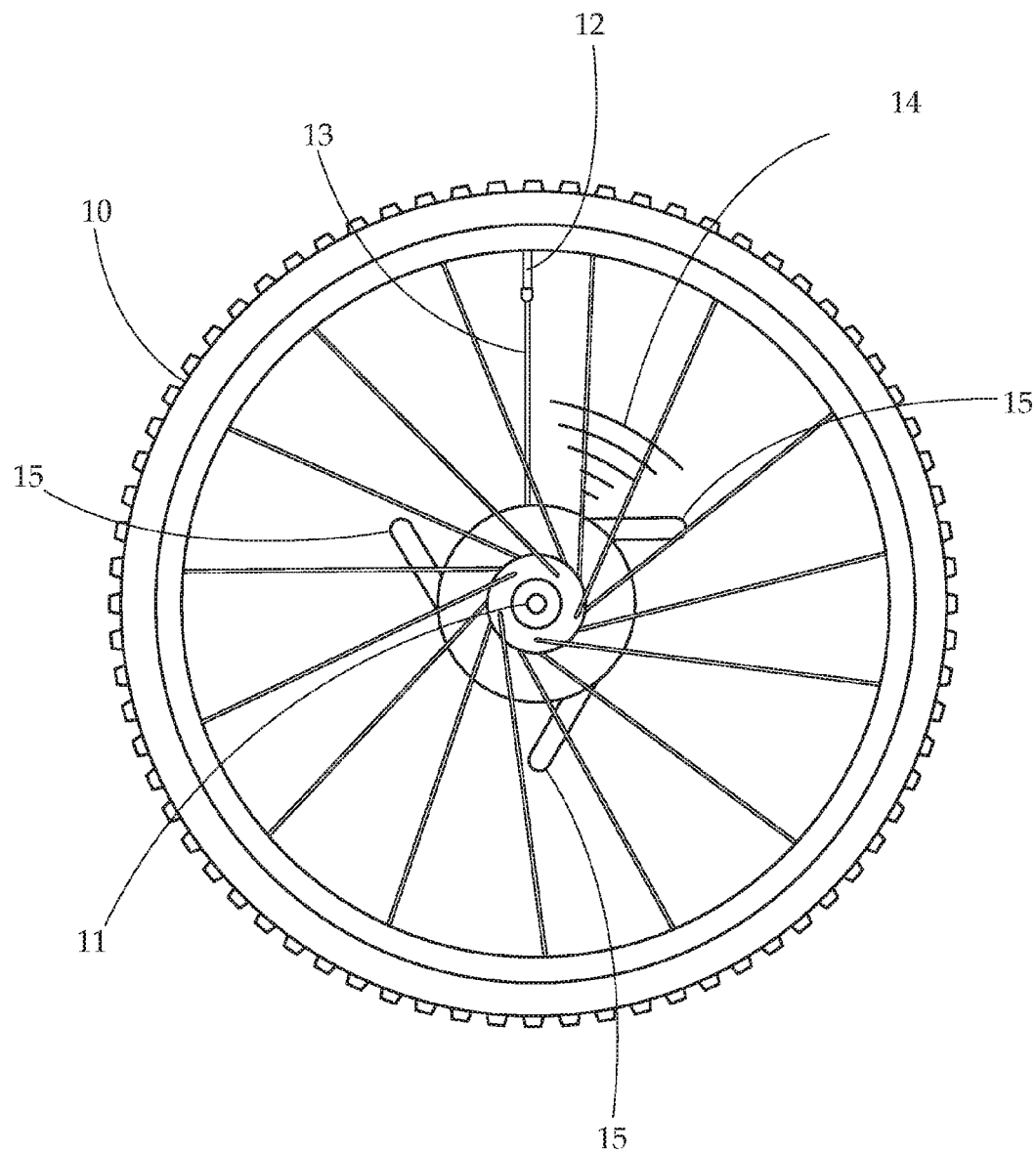
FIG. 1 provides a side view of a wheel having an embodiment of the wheel mounted portion of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a system for monitoring, increasing, and decreasing pressure in bicycle tires. This system may be configured to provide this pressure control on the go, as in while pedaling or otherwise riding the bicycle.

The system is formed generally by a wheel mounted portion on at least one and likely each wheel having a gas source, manifold, and air line connecting the gas source to the tire stem of to each wheel, and a control unit accessible while riding the bicycle.

The wheel mounted portion of the system may have a compressed gas source, a manifold, regulator, pressure sensor, and an air line connecting the gas source to tire stem through the manifold. The wheel mounted portion is connected to the tire, for example at the hub. Wireless electronic communication between the wheel mounted portion and control unit (via a wireless transceiver of the wheel mounted portion and control unit) allow the device to function, and spin with the wheel, without the complication of wires, tubes, and the like. This wireless communication also allows continual feedback regarding current tire pressure. In one embodiment, the regulator is capable, upon receiving a control signal, of allowing a decrease of pressure by releasing a gas within the tire, and of allowing an increase of pressure by directing gas from the gas source into the tire. The regulator may be calibrated, for example, to allow gas flow into the tire for a predetermined time interval corresponding to a known pressure increase.

The gas source may be any compressed source of gas for filling the tire of the bicycle. Exemplary gas sources include pressurized cartridges of air, carbon dioxide (CO2), nitrogen, and the like. Similarly, the tire may be filled with any gas, such as air, carbon dioxide, nitrogen, and the like. The gas in the gas source may match the gas within the tire. In one embodiment, the gas cartridge may be a 16 gram cartridge. In a particular embodiment, the gas source may comprise three small cartridges forming a triangle about the hub of the tire. Such cartridges, in some embodiments, may be threadedly connected to the manifold. In most embodiments, the cartridges or other gas source may be removable and replaceable. In many cases, for a long ride a rider may carry a plurality of gas cartridges in the event that one or more must be replaced.

In a particular embodiment, the wheel mounted portion may be formed of a number of small pieces to be assembled on the wheel hub. These small pieces may be small enough to fit through spokes of the wheel of the bicycle.

In one embodiment, the control unit may be connected to the bicycle anywhere that is accessible to a rider while riding the bicycle. For example, in one embodiment the control unit may be mounted to a handlebar of the bicycle. In another embodiment, the control unit may be separated from the bicycle. In separated embodiments, the control unit may be operated through an interface of a smartphone, tablet, or other computerized device in wireless communication with the wheel mounted portion. The control unit may be any type of device capable of receiving an input from a pressure sensor of the wheel mounted unit, and capable of providing a signal output to the wheel mounted unit to increase or decrease tire pressure.

In one embodiment, the control unit may comprise a microprocessor programmed and configured to receive a signal input and convert this input to a pressure reading. The control unit may further comprise a display in electronic communication with the microprocessor. The display may be configured to display a digital readout indicating the pressure within the tire. This display may be numerical, graphical, or the like.

The control unit may further comprise a memory. The memory may store instructions for the microprocessor operation. The memory may further store one or a plurality of pre-set pressure conditions selectable to instruct the microprocessor to signal the wheel mounted unit to automatically bring tires to the pre-set pressure condition selected. The control unit may further comprise a user interface allowing the rider to instruct the system to raise or lower tire pressure in one or both of the tires. The user interface may be, for example, one or a plurality of buttons, a touch screen, verbal controls, and the like. Further still, the control unit may have a wireless transceiver in communication with the microprocessor capable of sending and receiving wireless signals to the wheel mounted portion. This transceiver may transmit via radio signal, Bluetooth, WiFi, or other wireless signal. The user interface may communicate with the microprocessor which may transmit, through the transceiver, operating signals to the regulator of the wheel mounted portion to either decrease pressure in the tire by releasing gas in the tire through the stem, or increase pressure in the tire by allowing gas from the gas source into the stem.

Figure 2:
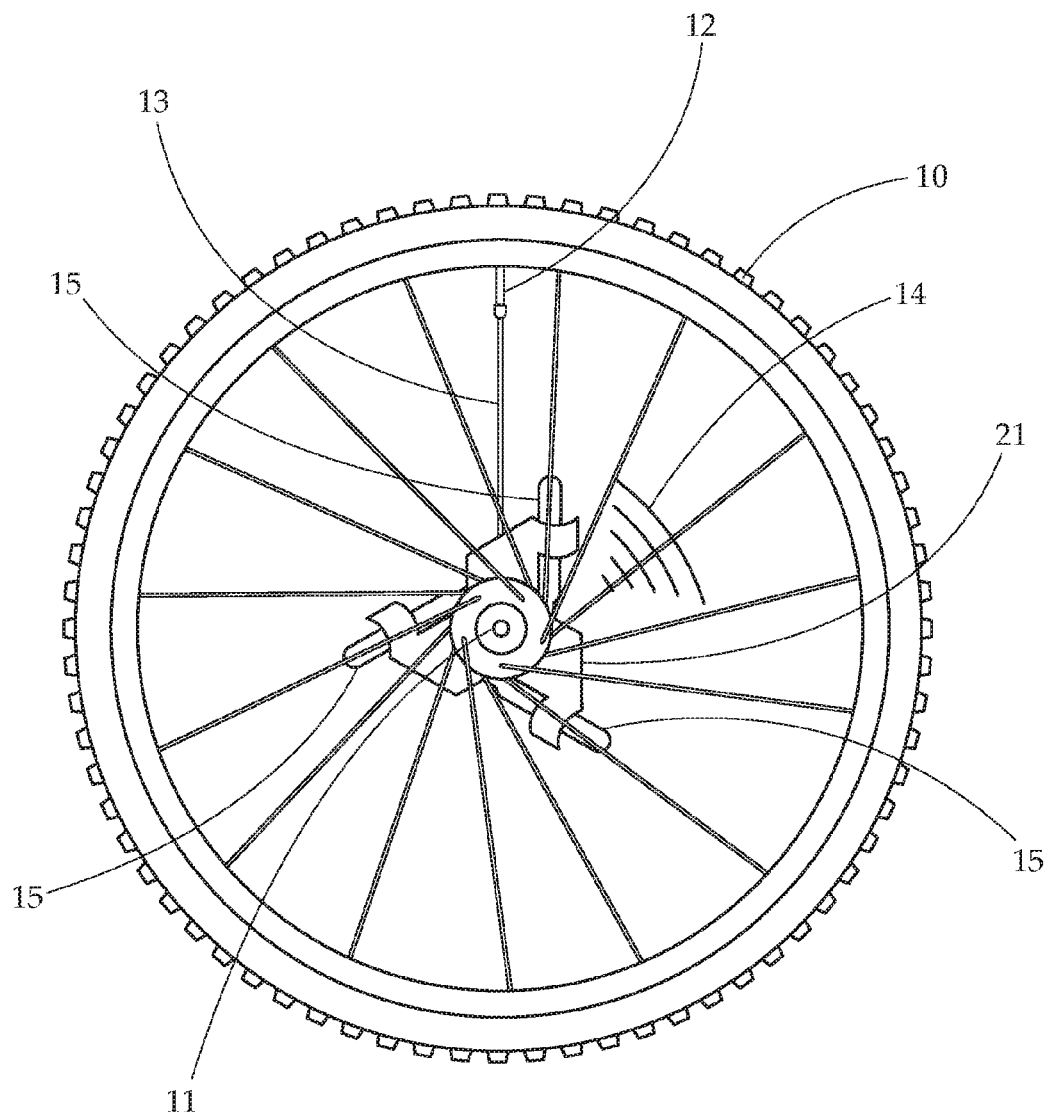
FIG. 2 provides a side view of a wheel having an embodiment of the wheel mounted portion of the present invention.

Turning now to FIGS. 1 and 2, left and right side views of a wheel having an embodiment of the wheel mounted portion of the air pressure control system attached are provided. Wheel 10 includes tire, spokes, and hub 11. In this embodiment, the wheel mounted portion is attached to the hub 11. The wheel mounted portion includes three gas source canisters 15. These are arranged in a triangular fashion about the hub 11. Each gas source canister 15 contains a pressurized gas, and is connected to the system through manifold 21. Manifold 21 is in turn attached to the hub 11. A wireless transceiver 14 (shown as a series of lines indicating the wireless signal sent by the transceiver) is connected to the manifold 21 and allows operation of a regulator (not shown). Regulator may open and close allowing gas flow from canister 15 through air line 13 into the tire through stem 12. Further, the regulator may allow release of gas from the tire to decrease the pressure therein. As such, the wheel mounted portion is self-contained on the wheel, and rotates along with the wheel.

Figure 3:
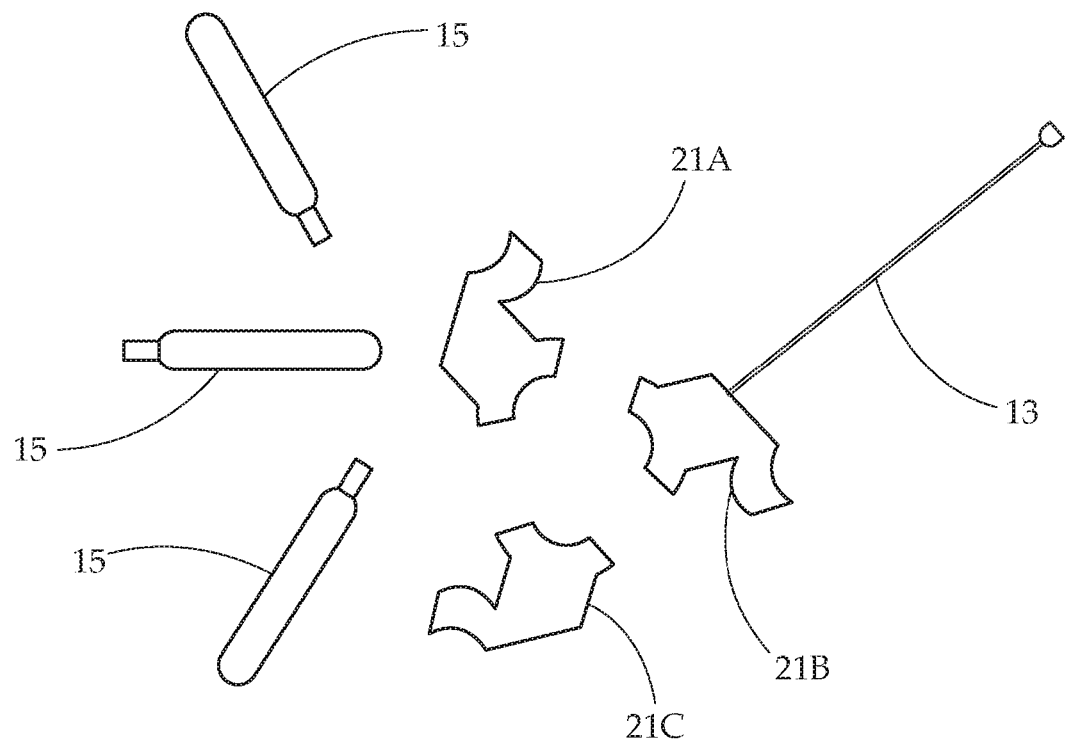
FIG. 3 provides an exploded view of an embodiment of the wheel mounted portion of the present invention.

FIG. 3 shows another embodiment of an exploded view of the wheel mounted portion. In this view, an embodiment of the wheel mounted portion is shown in its small pieces un-assembled. Manifold has three portions 21*a*, 21*b*, 21*c*, which may connect together about the hub. A gas source canister 15 may be attached into each portion 21*a*, 21*b*, 21*c*. Air line 13 extends out of manifold portion 21*b* and is connectable to the tire stem. The manifold, when assembled, provides gas flow from each canister 15 to the air line 13.

Figure 4:
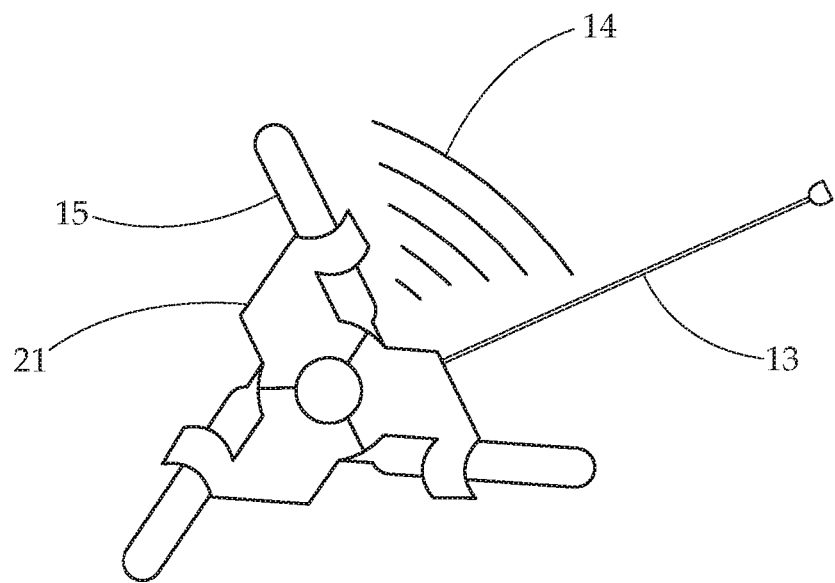
FIG. 4 provides a view of an embodiment of the wheel mounted portion of the present invention.

FIG. 4 provides another embodiment of an assembled view of the wheel mounted portion. In this view, an embodiment of the wheel mounted portion is shown with the varying pieces assembled. Manifold 21 portions are all connected together, forming a central area to receive the hub. A gas source canister 15 is attached into each portion of the manifold 21. Air line 13 extends out of the manifold 21 and is connectable to the tire stem. The manifold 21, as assembled, provides gas flow from each canister 15 to the air line 13. Wireless transceiver 14 sends and receives signals to and from the control unit (not shown). A regulator (not shown) is in communication with the transceiver to provide operation (increasing and decreasing pressure within the tire) of the system.

Figure 5:
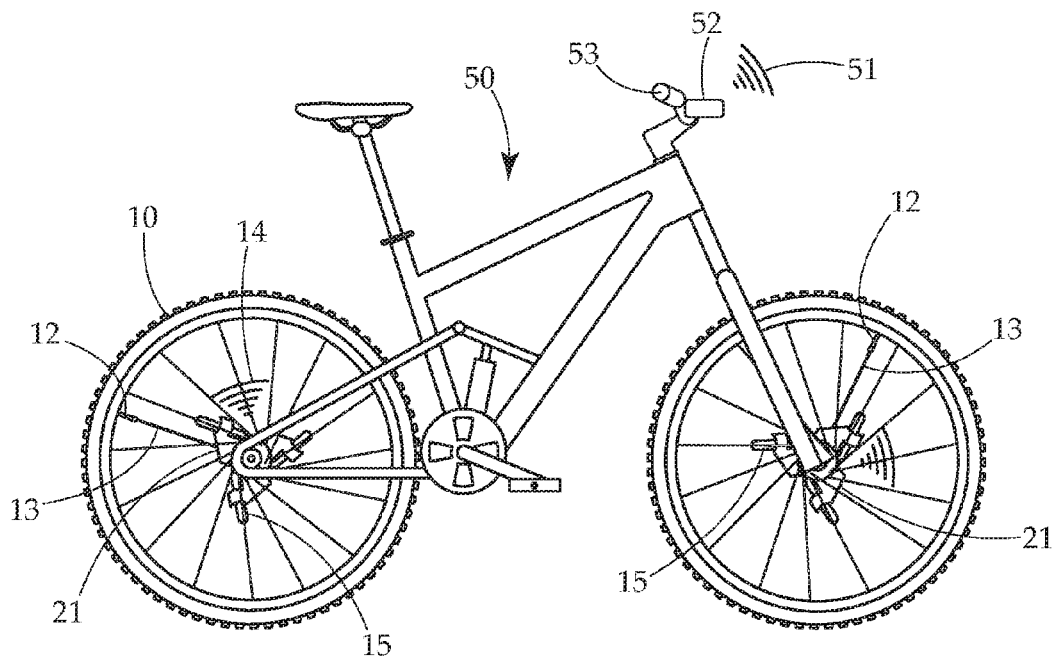
FIG. 5 provides a view of a bicycle having the present invention thereon.

FIG. 5 provides a view of the air pressure control system of the present invention mounted on a bicycle. A bicycle 50 has wheel mounted portions including canisters 15, and manifold 21 attached to the hubs of each wheel 10. Air lines 13 extend from manifold 21 to stem 12 of each wheel. A control unit 52 is mounted to handlebars 53 of the bicycle. The positioning of control unit 52 on the handlebars 53 allows a rider to quickly and easily monitor a pressure in each tire, and to adjust the pressure in each tire, either by raising or lowering the pressure. A wireless transceiver 51 on the control unit 52 communicates with transceivers 14 on each wheel mounted portions of the system. Transceiver 51 receives data about pressure within each tire sent from the transceivers 14, and communicates data regarding pressure control to each transceiver 14 on the two tires. As such, a rider may increase or decrease pressure in the front and rear tire, and may monitor the current tire pressure in front and rear tire using the system of the present invention. In the preferred embodiment, shown, the three canisters 15 are arranged in a triangular orientation about the hub 11.

This configuration may, among other things, provide an optimal balance of weight about the hub to limit any rotational issues that could be caused by a weight imbalance on the hub. Indeed as shown in this embodiment, and as possible in many other embodiments, the manifold and canisters are mounted around an existing bicycle wheel hub. This optimizes balance of the wheel, as well as the bicycle itself. Further, the hub mounting embodiments are easy to install and can be fitted onto existing bicycles. Further, by attaching the wheel mounted portion to the hub, the structure is protected by the hub, wheel spokes, front forks, disc brakes, gear carriage, and the like, causing a durable, rugged implementation. All of these advantages even further provide an easy and inexpensive to manufacture solution to the problem in the prior art.

Figure 6:
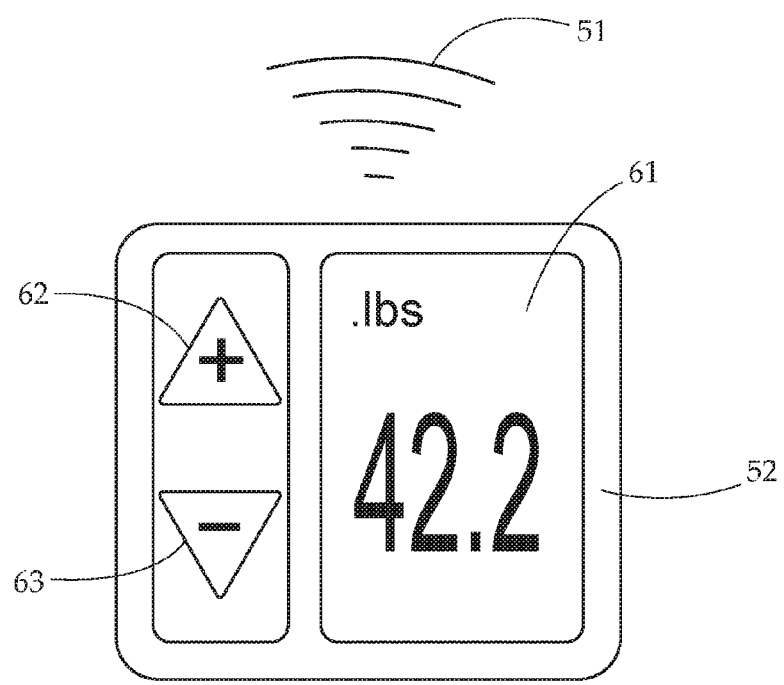
FIG. 6 provides a view of an embodiment of a control unit of the present invention.

FIG. 6 provides a view of an embodiment of the control unit 52. The control unit 52 includes transceiver 51, as well as display 61, and user interface buttons 62 and 63. The display 61 provides a visual presentation of a pressure within one or both tires, among other feedback relating to the system. User interface buttons 62 and 63 allow for raising and lowering the pressure in a tire (or both tires), respectively.

Figure 7:
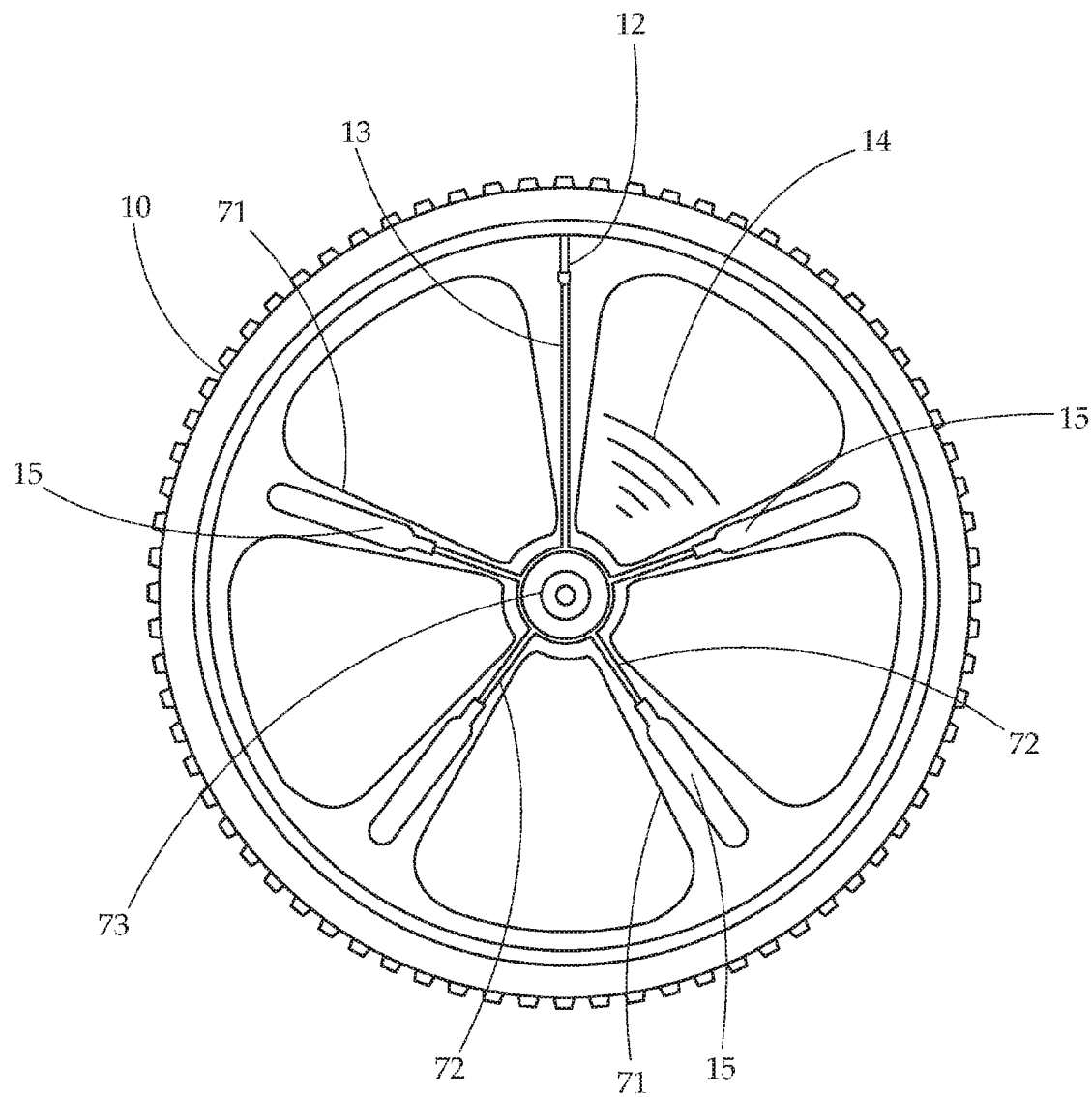
FIG. 7 provides a side view of a wheel having another embodiment of the wheel mounted portion of the present invention.

FIG. 7 provides a view of another embodiment of a wheel having an embodiment of the wheel mounted portion of the air pressure control system attached. Wheel 10 includes tire, spokes 71, shown here as five large spokes, and hub. The wheel 10 shown herein is representative of common alloy wheels having fewer larger spokes. These wheels may have three or more spokes. Typically, these wheels are known in the art as "mag wheels" and will be referred to as such hereafter. Gas source 15, shown here as a canister, which contains pressurized gas, is positioned, at least partially, (removably or permanently) within spoke 71. Air line 72 connects the gas source 15 to manifold 73, which in this view is positioned within an interior hub of the mag wheel 10. In turn, air line 13, which is also positioned within spoke 71, connects the manifold 73 and gas source 15 to stem 12 and the interior of the wheel. A wireless transceiver 14 (shown as a series of lines indicating the wireless signal sent by the transceiver) is connected to the manifold 21 and allows operation of a regulator (not shown) to control gas flow in and/or out of the tire interior. In another embodiment, the gas sources 15 may be attached to an exterior of the spokes 71, and manifold 73 and air line 13 may also be attached to outsides of the mag wheel.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A system for controlling a tire pressure comprising:
a control unit; and
a first and second wheel mounted portion, each wheel mounted portion comprising:
a manifold attached to a hub of a wheel;
a compressed gas source, wherein the gas source is a compressed gas canister, having an outlet connected to the manifold, the compressed gas canister connected to the wheel by the manifold;
an air line extending from the manifold in fluid communication with the compressed gas source through the manifold, the air line attachable to a stem of the wheel;
a pressure sensor in communication with the air line configured to measure a pressure within the tire;
a regulator configured to allow gas to exit the stem of the tire, and configured to allow gas from the compressed gas source to flow into the tire; and
a transceiver configured to send a data from the pressure sensor relating to the pressure within the tire, and configured to receive a signal instructing the regulator action;
wherein the control unit comprises:
a second transceiver in communication with the transceiver of each of the first and second wheel mounted portions; and
a user interface in communication with the microprocessor allowing an input instructing an increase in tire pressure and an input instructing a decrease in tire pressure;
a microprocessor in communication with the transceiver of the control unit programmed and configured to communicate operating signals through the transceiver to the regulator of each wheel mounted portion to either decrease pressure in the tire by releasing gas in the tire through the stem, or increase pressure in the tire by allowing gas from the gas source into the stem in response to input from the user interface.

2. The system for controlling a tire pressure of claim 1 further comprising a plurality of gas sources on the first and second wheel mounted portion each of the plurality of gas sources being a compressed gas canister.

3. The system for controlling a tire pressure of claim 2 wherein each of the plurality of gas canisters is threadedly attached to the manifold of each of the first and second wheel mounted portion.

4. The system for controlling a tire pressure of claim 1 further comprising three gas sources on each of the first and second wheel mounted portion.

5. The system for controlling a tire pressure of claim 4 wherein the three gas sources are arranged in a triangle about the hub of the wheel.

6. The system for controlling a tire pressure of claim 1 wherein the control unit is mounted on a steering structure of a vehicle.

7. The system for controlling a tire pressure of claim 1 wherein the control unit is a mobile wireless computing device.

8. A system for controlling a bicycle tire pressure comprising:
   a control unit; and
   a first and second wheel mounted portion, each wheel mounted portion comprising:
      a manifold attached to a hub of a bicycle wheel;
      a compressed gas source, wherein the gas source is a compressed gas canister, having an outlet connected to the manifold, the compressed gas canister connected to the bicycle wheel by the manifold;
      an air line extending from the manifold in fluid communication with the compressed gas source through the manifold, the air line attachable to a stem of the wheel;
      a regulator configured to allow gas to exit the tire, and configured to allow gas from the compressed gas source to flow into the tire; and
   wherein the control unit comprises:
      a user interface in communication with the microprocessor allowing an input instructing an increase in tire pressure and an input instructing a decrease in tire pressure; and
      a microprocessor in communication with regulator, programmed and configured to receive a signal input from the user interface, and configured to communicate operating signals to the regulator of each wheel mounted portion to either decrease pressure in the tire, or increase pressure in the tire in response to input from the user interface.

9. The system for controlling a bicycle tire pressure of claim 8 further comprising a plurality of gas sources on the first and second wheel mounted portion each of the plurality of gas sources being a compressed gas canister.

10. The system for controlling a bicycle tire pressure of claim 9 wherein each of the plurality of gas canisters is threadedly attached to the manifold of each of the first and second wheel mounted portion.

11. The system for controlling a bicycle tire pressure of claim 8 wherein the bicycle wheel is an alloy wheel comprising three spokes, and wherein the gas cylinder is positioned within one of the three spokes.

12. The system for controlling a bicycle tire pressure of claim 11 wherein the air line is positioned within one of the three spokes.

13. The system for controlling a bicycle tire pressure of claim 8 wherein the control unit is mounted on a steering structure of a vehicle.

14. The system for controlling a bicycle tire pressure of claim 8 wherein the control unit is a mobile wireless computing device.

15. A system for controlling a bicycle tire pressure comprising:
   a control unit; and
   a first and second wheel mounted portion, each wheel mounted portion comprising:
      a manifold attached to a hub of a bicycle wheel;
      a compressed gas source, wherein the gas source is a compressed gas canister, having an outlet connected to the manifold, the compressed gas canister connected to the bicycle wheel by the manifold;
      an air line extending from the manifold in fluid communication with the compressed gas source through the manifold, the air line attachable to a stem of the wheel;
      a pressure sensor in communication with the air line configured to measure a pressure within the tire;
      a regulator configured to allow gas to exit the stem of the tire, and configured to allow gas from the compressed gas source to flow into the tire; and
      a transceiver configured to send a data from the pressure sensor relating to the pressure within the tire, and configured to receive a signal instructing the regulator action;
   wherein the control unit comprises:
      a second transceiver in communication with the transceiver of each of the first and second wheel mounted portions;
      a microprocessor in communication with the second transceiver programmed and configured to receive a signal input from the pressure sensor and convert this input to a pressure reading;
      a display in communication with the microprocessor, the display configured to provide a visual indication of the pressure within the tire as converted by the microprocessor; and
      a user interface in communication with the microprocessor allowing an input instructing an increase in tire pressure and an input instructing a decrease in tire pressure;
   wherein the microprocessor is further programmed and configured to communicate operating signals through the transceiver to the regulator of each wheel mounted portion to either decrease pressure in the tire by releasing gas in the tire through the stem, or increase pressure in the tire by allowing gas from the gas source into the stem in response to input from the user interface.

16. The system for controlling a bicycle tire pressure of claim 8 further comprising a plurality of gas sources on the first and second wheel mounted portion each of the plurality of gas sources being a compressed gas canister.

17. The system for controlling a bicycle tire pressure of claim 9 wherein each of the plurality of gas canisters is threadedly attached to the manifold of each of the first and second wheel mounted portion.

18. The system for controlling a bicycle tire pressure of claim 8 wherein the bicycle wheel is an alloy wheel comprising three spokes, and wherein the gas cylinder is positioned within one of the three spokes.

19. The system for controlling a bicycle tire pressure of claim 11 wherein the air line is positioned within one of the three spokes.

20. The system for controlling a bicycle tire pressure of claim 8 wherein the control unit is mounted on a steering structure of a vehicle.

* * * * *